(12) United States Patent
Koenig

(10) Patent No.: US 6,405,026 B1
(45) Date of Patent: Jun. 11, 2002

(54) COMMUNICATION DEVICE AND METHOD

(75) Inventor: Matthias Koenig, Taunusstein (DE)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/499,417

(22) Filed: Feb. 7, 2000

(30) Foreign Application Priority Data

Jul. 23, 1999 (DE) .......................... 199 34 652

(51) Int. Cl.[7] ................................. H04B 1/26

(52) U.S. Cl. .................. 455/313; 455/308; 455/311
(58) Field of Search ................. 455/313, 303, 455/306, 308, 311, 312

(56) References Cited

U.S. PATENT DOCUMENTS

| | | | | |
|---|---|---|---|---|
| 5,548,839 A | * | 8/1996 | Caldwell et al. | ............ 455/313 |
| 5,859,878 A | * | 1/1999 | Phillips et al. | ................ 455/74 |
| 5,999,574 A | * | 12/1999 | Sun et al. | .................... 455/313 |
| 6,112,070 A | * | 8/2000 | Katsuyama et al. | ........ 455/307 |
| 6,208,876 B1 | * | 3/2001 | Raussi et al. | ................ 455/557 |

FOREIGN PATENT DOCUMENTS

| | | |
|---|---|---|
| DE | 31 14597 A1 | 11/1982 |
| DE | 42 25 821 A1 | 2/1994 |
| DE | 197 19 658 A1 | 9/1998 |

* cited by examiner

*Primary Examiner*—Daniel Hunter
*Assistant Examiner*—Thuan T. Nguyen
(74) *Attorney, Agent, or Firm*—Steven R. Santema

(57) ABSTRACT

A radio communication device (100) such as a mobile telephone comprises signal converters (110, 130, 140), a band-pass filter unit (120) and an oscillator (150). In the receiving mode (I) a first converter (110) converts an HF signal into an intermediate ZF signal (20) which, upon filtering by the band-pass filter unit (120), is converted into an NF signal by means of a second converter (130). In the transmission mode (II), the device (100) employs the first converter (110) and the filter (120) for compression of the dynamic range of a microphone signal (40). The first converter (110) converts the microphone signal (40) into a further intermediate ZF signal (50) which is subjected to amplitude limitation by means of a limiter circuit (121) in the filter unit (120) and filtered by means of a filter (122). The third converter (140) converts the filtered and limited signal (51, 52) again into a low-frequency signal (60).

16 Claims, 1 Drawing Sheet

COMMUNICATION DEVICE AND METHOD

FIELD OF THE INVENTION

The present invention relates to communication devices such as digital and analog radio sets for voice and/or data processing, as well as to a method of operating these sets.

BACKGROUND OF THE INVENTION

In speech communication with (digital or analog) radio sets the volume of the voice signal is decisive for the intelligibility. The speaker can speak aloud or in a low voice and next to or remote from the apparatus. The voice signal generated by the microphone in the transmitter is therefore subject to variations in dynamics. The listener, however, expects to receive a largely uniform volume (low dynamics). Variations of the signal should therefore be suppressed along the transmission path from the microphone to the loudspeaker.

It is common to ensure a compression of the dynamic range of the voice signal by means of closed-loop control circuits which are connected in the transmitter between the microphone and the modulator. Closed-loop control circuits, however, present disadvantages which become manifest in recovery time constants, noise and increased nonlinear distortion factors of the voice signal. Low-pass filters for attenuating the harmonics introduced as parasitic effects by the closed-loop control circuit may possibly produce an undesirable effect on the voice signal.

An alternative dynamic compressor is composed of a first transponder, a band-pass filter, a second transponder and a common oscillator. On account of the higher manufacturing costs and dimensions (e.g. silicon area), however, this compressor does not appear to be attractive for application in a radio apparatus.

The problem underlying the invention consists in the provision of an improved communication device which mitigates or avoids the aforementioned disadvantages and these and other disadvantages and limitations of the prior art. This problem is solved with a device of the claimed general type and with a method in accordance with the claims.

DETAILED DESCRIPTION OF A PREFERRED EMBODIMENT

Figure 1:
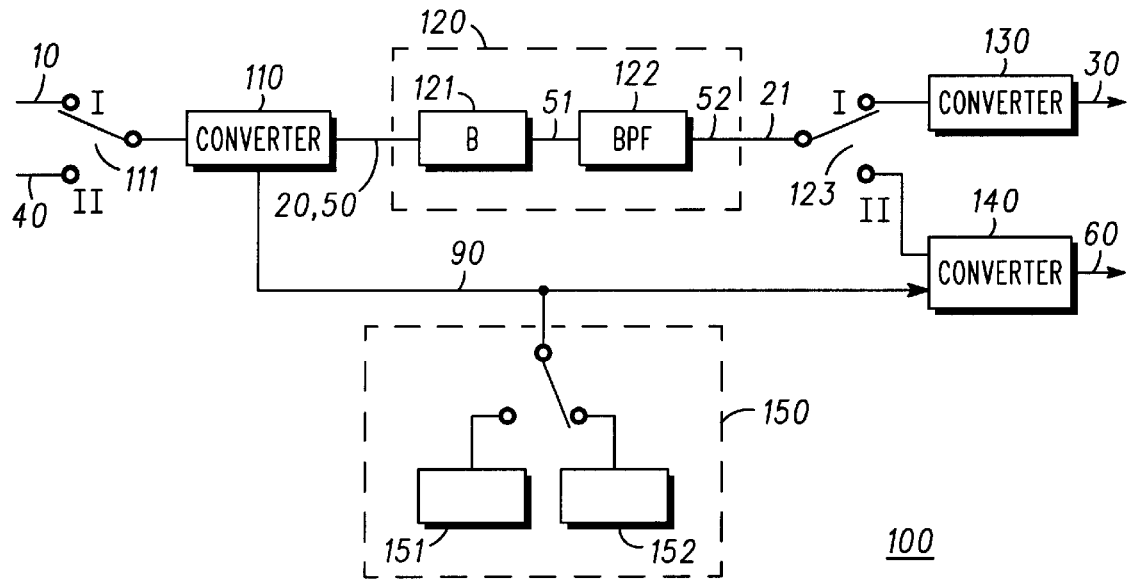
FIG. 1 illustrates a simplified block diagram of a communication device according to the present invention.

FIG. 1 shows a simplified block diagram of a communication device 100 in accordance with the present invention. Signals are represented with two-digit reference numerals whilst circuit components are indicated by three-digit reference numerals.

The communication device 100 is a combined transmitter/receiver unit operating in modes I (usually receiving) and II (usually transmission). Transmission and receiving paths are preferably implemented as radio links. The present invention is suitable for application in radio telephone communicators of any type and is particularly well suitable for digital and analog mobile telephones.

In a preferred embodiment the communication device 100 comprises the following components: converter 110, band-pass filter unit 120 with limiter circuit 121 ("B") and band-pass filter 122 ("BPF"), oscillator 150 with synthesizer oscillator 151, and RC oscillator 152, converters 130 and 140, as well as the commutators 111 and 123, as is symbolically represented.

Transmitting and receiving sets operate on signals in various frequency ranges. In the present invention a distinction is made among three different frequency ranges separated from each other. In other words, the frequency ranges should not overlap each other.

In the following description the term "high frequency" (HF, first range, e.g. 50 MHz), "intermediate frequency (ZF, second range, e.g. $F_{ZF}$=150 kHz, 10 kHz bandwidth) and "low frequency" (NF, third range, e.g. 300 . . . 3000 Hz, $F_{NF\ MIN}$ . . . $F_{NF\ MAX}$, voice) will be used to identify the frequency ranges in which the signals are present. This frequency assignment will, however, be used only for explanatory purposes. Based on the present description, the one skilled in the art will be in the position to design the communication device 100 for other frequencies, too.

In the operating mode I the commutators 111 and 123 are set to position I. The communication device 100 receives the HF signal 10 for instance from an antenna, which is not illustrated here, or from a signal processor unit with band-pass filtering in the HF range. The commutator 110 receives the oscillator signal 90 from the oscillator 150 (preferably from the synthesizer oscillator 151) and converts the HF signal 10 into the ZF signal 20. The band-pass filter unit 120 has the function of a selective ZF amplifier and filters the ZF signal 20 to generate the intermediate signal 21. The converter 130 (demodulator) converts the intermediate signal 21 to form the NF signal 30. The NF signal 30 may be an analog voice signal or a base band signal for digital data communication, for instance. In other words, in the operating mode I the communication device 100 in its preferred embodiment behaves like a common superheterodyne receiver. Such devices are well known to the one skilled in the art. An abstract may be found in Chapter "Receivers" on pages Q1 to Q63 of the publication by Meinke/Gundlach: "Taschenbuch der Hochfrequenztechnik" [*Vademecum of High-Frequency Technology*], published by K. Lange and K.-H. Löcherer, fifth revised edition, Springer-Verlag, Berlin, Heidelberg, New York, 1992, ISBN 3-540-54717-7.

In the operating mode II the commutators 111 and 123 are set to position II. In accordance with the present invention the communication device 100 uses the converter 110 and the band-pass filter unit 120 also for compression of the dynamic range. The converter 110 receives the NF signal 40, e.g. from a microphone not illustrated here (i.e. a voice signal). The converter 110 receives the oscillator signal 90 from the oscillator 150 and converts the NF signal 40 initially into the ZF signal 50. In the band-pass filter unit 120 the limiter circuit 121 limits the ZF signal 50 (e.g. amplitude limitation) to generate the intermediate signal 51, and the band-pass filter 122 filters the intermediate signal 51 to form the intermediate signal 52. The term "limitation" is to be understood here in the sense that the signal amplitude must not exceed a maximum level. The converter 140 then converts the intermediate signal 51 to form again an NF signal 60 (i.e. equally a voice signal) which, compared against the NF signal 40, presents restricted dynamics.

In other words, the present invention combines the functions of the voice signal compressor (for compression of the dynamic range in transmission) and of the selector (for frequency selection in receiving operation). For transmission, the microphone signal 40 to be compressed is temporarily converted into a first intermediate frequency signal 50/51/52 (NF into ZF in converter 110, ZF into NF in converter 140). For receiving, the HF signal 10 is converted into a second ZF signal 20. In both functions the band-pass filter unit 120 is made use of in alternation: in transmission with the first ZF signal, and in receiving mode with the second ZF signal.

The oscillator 150 can provide the oscillator signal 90 alternatively with the synthesizer oscillator 151 (receiving mode) or with the RC oscillator 152 (transmission mode). In the transmission mode the frequency constancy of the signal 90 is less critical than in the receiving mode because in transmission the signal 90 has a frequency which is lower than the signal in the receiving mode. The expert will be in the position to compensate a frequency drift in the oscillator 150 and the filter 120 in such a way that a largely distortion-free compression of the dynamic range will be ensured also with less expensive RC components (relative to the price level of synthesizers). The application of the same manufacturing technologies in the oscillator 150 and the filter unit 120 is expedient. When highly advanced technology is employed (e.g. DDS—Direct Digital Synthesis) the oscillator 150 can be implemented with a single synthesizer only. The splitting into a synthesizer oscillator 151 and an RC oscillator 152 would then be no longer necessary.

The band-pass filter unit 120 is preferably supplied with signals 20 or 50, respectively, both in the receiving mode (operating mode I) and in the transmission mode (operating mode II), which signals have substantially the same frequency (i.e. the same intermediate frequency).

In the operating mode I the signal amplification gain in the limiter circuit 121 is preferably smaller than it is in the operating mode II. In operating mode I the limiter circuit 121 may also have the gain v=1 (optional bridging by switches is possible).

The transmission function of the band-pass filter 122 (bandwidth and precise intermediate frequency) can preferably be switched. The band-pass filter 122 is preferably designed as an integrated filter. The application of switched capacitors or of active analog filters (e.g. RC circuits with added operational amplifiers) presents itself here. This allows for the complete integration of the elements 110–150 on a single silicon chip.

An introduction into switched capacitors may be found in the publication by Ezz I. El-Masry: "Switched-Capacitor Circuits" in Chapter 43 on pages 611 to 621 of the manual "The Electronics Handbook", published by Jerry C. Whitaker, Technical Press, Beaverton, Oreg., ISBN 0-8493-8345-5.

An introduction into active analog filter technology may be found in Chapter 14 "Aktive Filter" [Active Filters ] on pages 376 to 439 of the publication "Halbleiterschaltungstechnik" [*Semiconductor Circuit Technology*] by U. Tietze and Ch. Schenk, sixth newly revised and extended edition, Springer-Verlag, Berlin, Heidelberg, New York, Tokyo, 1983, ISBN 3-540-12488-8.

The commutators 111 and 123 are preferably designed as CMOS switches (so-called transfer gates, transmission gates). The band-pass filter 122 may also include a delay function for noise blanker or interference blanker.

Figure 2:
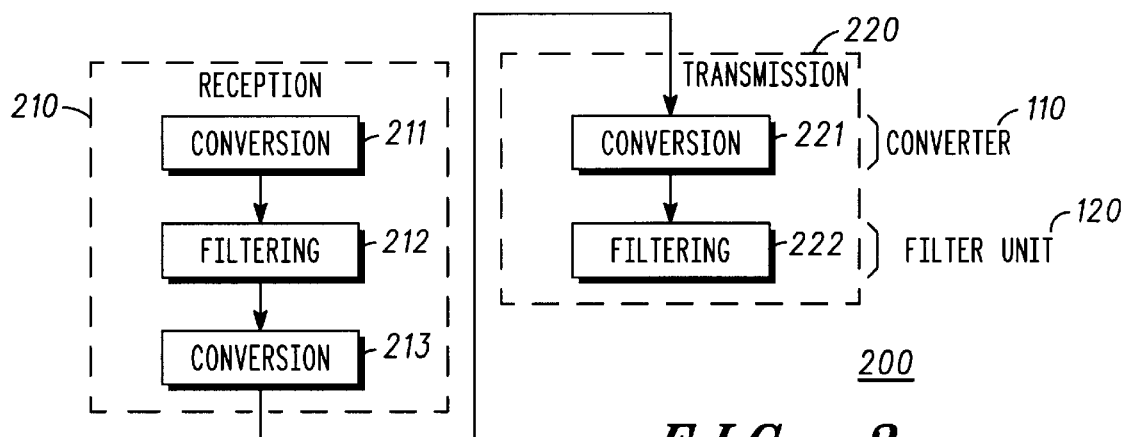
FIG. 2 is a simplified schematic flow chart of a method of operating the communication device according to FIG. 1.

FIG. 2 illustrates a simplified flow chart of a method 200 of operating a radio device in accordance with the present invention. As is represented by the frames in dashed lines in FIG. 2, the method 200 comprises the steps of receiving 210

(cf. operating mode I) and transmission 220 (operating mode II) performed in alternation. The sub-steps of conversion and filtering, which are indicated in the steps 210 and 220, are each performed substantially at the same time.

In the receiving operation 210 the HF signal 10 is converted into the ZF signal 20 (conversion 211), the ZF signal 20 is filtered to generate the intermediate signal 21 (filtering 212), and the intermediate signal 21 is converted into the NF signal 30 (conversion 213).

In the transmission step 220 the NF signal 40 (e.g. voice) is converted into the ZF signal 50 (conversion 221) and the ZF signal 50 is filtered with amplitude limitation to generate the intermediate signal 52 (filtering 222) for compression of the dynamic range. The method is characterized by the provision that in the transmission step 220 the NF signal 40 is converted into the ZF signal 50 by the same converter 110 (step 211) which converts the HF signal 10 into the ZF signal 20 in the receiving step 210 (step 212) and that the ZF signal 50 is filtered to form the intermediate signal 52 by the same band-pass filter unit 120 (step 221) which in the receiving step filters the ZF signal 20 into the intermediate signal 21 (step 222).

In other words, the steps of conversion 211 and 221 are performed by the same converter 110 and the filtering steps 212 and 221 are performed by the same band-pass filter unit 120. The amplitude limitation, which is required in the transmission step 220 for compression of the dynamic range, is performed by means of components (i.e. in the limiter circuit 120 of the unit 120) which are also employed in the receiving operation.

In distinction from prior art hence the band-pass filter unit is used for both the transmission and the receiving operations. As a result, the disadvantages mentioned above (e.g. a large silicon area), which are involved in prior art, are avoided. The alternative dynamic-range compressor gains attractiveness and an improved communication device is provided.

Figure 3:
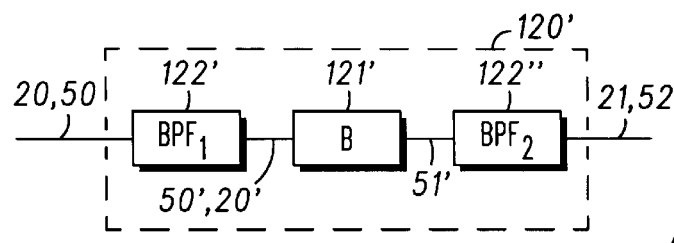
FIG. 3 is a simplified block diagram of a band-pass filter unit which may be used as an alternative in the communication device according to FIG. 1.

FIG. 3 shows a simplified block diagram of the band-pass filter unit 120' which may be used as an alternative in the communication device 100. In FIGS. 1 and 3 similar reference numerals are used to denote similar elements and signals. The filter unit 120' consists of the band-pass filter 122' ("BPF$_1$"), the limiter circuit 121' ("B") as well as the band-pass filter 122" ("BPF$_2$"). Compared against the filter unit 120 in FIG. 1 the band-pass filter is here subdivided into two components: BPF$_1$ ahead of the limiter circuit and BPF$_2$ joining the limiter circuit.

In the operating mode I the filter 120' filters the ZF signal 20 to generate the intermediate signal 21 (cf. FIG. 1, via BPF$_1$, B and BPF$_2$), with the limiter circuit 121' presenting a constant gain.

In the operating mode II the band-pass filter 122' filters the ZF signal 50 (cf. FIG. 1) initially to form the signal 50' which is then limited by the limiter circuit 121' for forming the signal 51', whereupon the band-pass filter 122" filters the signal 51' to form the signal 52 (cf. FIG. 1). The limiter circuit 121' operates on a gain which is a function of the amplitude of the signal 50'. Band-pass filters 122' and 122" are preferably used for single-side band filtering. The filter center frequency F$_{Mitte}$ of both band-pass filters 122' and 122" corresponds preferably to the intermediate frequency, shifted by half of the low frequency:

$$F_{Mitte}=F_{ZF}+0.5*F_{NF\ MAX}$$

or $F_{Mitte}=F_{ZF}-0.5*F_{NF\ MAX}$.

While the invention has been described in terms of particular structures, devices and methods, those of skill in the art will understand based on the description herein that it is not limited merely to such examples and that the full scope of the invention is properly determined by the claims that follow.

What is claimed is:

1. Communication device wherein in a first operating mode
    a first converter converts a first signal, which is within a first frequency range, into a second signal, which is within a second frequency range,
    a band-pass filter unit filters said second signal to a first intermediate signal,
    a second converter converts said first intermediate signal to a third signal, which is within a third frequency range;
alternatively in a second operating mode, for compression of the dynamic range, a fourth signal in said third frequency range is converted initially into a fifth signal in said second frequency range, and then into a sixth signal in said third frequency range,
said communication device is characterized in that in said second operating mode
    said first converter converts said fourth signal into said fifth signal,
    said band-pass filter unit uses a limiter circuit to limit said fifth signal in a second intermediate signal and a band-pass filter to filter said second intermediate signal in a third intermediate signal, and
    a third converter converts said third intermediate signal to said sixth signal.

2. Communication device according to claim 1, wherein said first operating mode is the receiving mode and wherein said second operating mode is transmission or transmitting mode.

3. Communication device according to claim 2, wherein said first frequency range is a high-frequency range, said second frequency range is an intermediate-frequency range separate from said first range, and said third frequency range is a low-frequency range separate from said other ranges.

4. Communication device according to claim 3, wherein said first signal and said fourth signal are voice signals.

5. Communication device according to claim 1, wherein said first converter and said third converter operate on an oscillator signal from a common oscillator.

6. Communication device according to claim 1, wherein a signal amplification gain of said limiter circuit in said first operating mode is smaller than the gain in said second operating mode.

7. Communication device according to claim 1, wherein said band-pass filter is switchable.

8. Communication device according to claim 1, wherein said band-pass filter is an integrated filter.

9. Communication device according to claim 8, wherein said band-pass filter is implemented in the form of a switched capacitor filter.

10. Communication device according to claim 8, wherein said band-pass filter is implemented in the form of an active analog filter.

11. Communication device according to claim 8, wherein said band-pass filter includes a delay function for noise blankers.

12. Communication device according to the claim 5, wherein in said common oscillator said oscillator signal
    is provided by a synthesizer oscillator in the first mode, and
    is provided by an RC oscillator in the second mode.

13. Communication device according to the claim 2, wherein said first converter and said third converter operate on an oscillator signal from a common oscillator, and wherein said oscillator signal is provided by a DDS synthesizer in said common oscillator in both operating modes.

14. Radio apparatus including a transmitter and a receiver, characterized by the combination
    of the function of a voice signal compressor in the transmitter for compression of the dynamic range of a microphone signal with temporary conversion of said microphone signal to be compressed into a first intermediate frequency signal, with
    the function of a selector, with a high-frequency signal being converted into a first intermediate-frequency signal in the receiver,
and wherein a band-pass filter used by both functions in alternation is operated with said first intermediate frequency signal in a transmission mode and with said second intermediate frequency signal in a receiving mode.

15. Radio apparatus according to claim 14, wherein said band-pass filter unit is operated with substantially the same intermediate frequency both in said receiving mode and said transmission mode.

16. Method of operating a radio apparatus, comprising the alternating steps of receiving and transmission, wherein in the receiving step an HF signal is converted into a ZF signal, said ZF signal is filtered into a first intermediate signal, and said first intermediate signal is converted into a first NF signal, and wherein for compression of the dynamic range in transmission a second NF signal is converted into a second ZF signal, and said second ZF signal is filtered, with limitation of the amplitude, for forming a second intermediate signal, which method is characterized in that in transmission said second NF signal is converted into said second ZF signal by the same first converter which converts said HF signal into said first ZF signal in the receiving step, and that said second ZF signal is filtered for forming said second intermediate signal by the same band-pass filter unit which, in the receiving step, filters said first ZF signal for generating said first intermediate signal.

* * * * *